Patented May 24, 1949

2,470,953

UNITED STATES PATENT OFFICE 2,470,953

ALKYD RESIN-OXIDIZED BUTADIENE POLYMER EMULSION

John W. Robertson, Englewood, and John B. Rust, East Hanover, N. J., assignors, by direct and mesne assignments, of one-half to Montclair Research Corporation, Montclair, N. J., a corporation of New Jersey, and one-half to Ellis-Foster Company, a corporation of New Jersey No Drawing. Application August 31, 1946, Serial No. 694,412

9 Claims. (Cl. 260—7.5)

This invention relates to a resinous composition for treating textile fibers where it is desired to change the character of the fibers to achieve certain results such as sizing or bodying with water-insoluble materials, to increase strength and wear resistance, and to impart heat-sealing qualities to a woven structure made wholly or partially of the treated fibers, such as a rug backing. Resins for this use are preferably applied in emulsion form to reduce costs and aid in controlling penetration into the fiber and should be easily emulsifiable. The resins themselves must be made of very low-cost materials and by simple processes to fit the economic demand. Since most low-cost resins now available are either too brittle when hard and too sticky when soft and flexible, a method is needed to reduce tackiness and maintain or improve flexibility after application to the fiber.

An object of the invention is to provide a low-cost resinous composition emulsified, or dispersed, in water for application to textile fibers to impart sizing, reinforcing and heat-sensitive properties thereto and which dries to a non-tacky and flexible film on the fibers to render them heat-sealable at any desired stage in the manufacture of products from the treated fibers.

Other objects include the novel products resulting from the utilization of the emulsions of the present invention.

Still further objects of the present invention will appear from the more detailed description set forth below, it being understood that this more detailed description is given by way of illustration and explanation only, and not by way of limitation, since various changes therein may be made by those skilled in the art without departing from the scope and spirit of the present invention.

These objects are achieved by means of mixtures of emulsions of (A) alkyd or modified alkyd resins and (B) rubber-like polymer or co-polymer resins which have been especially processed to reduce tackiness when applied to fibers.

In accordance with the present invention, aqueous emulsions of a synthetic butadiene polymer or co-polymer with another unsaturated compound such as styrene, acrylonitrile, methyl methacrylate, etc., are prepared in such a manner that the rubber-like material is in a certain type of pre-vulcanized condition so that upon deposition of the polymer along with an alkyd resin in or about the fibers or textiles, the polymer is in a non-tacky condition and gives a non-tacky deposit.

As formed in the emulsions utilized in accordance with the present invention, the butadiene polymers and co-polymers are in a condition in which they are unsuitable as synthetic rubber-like material. If coagulated by any suitable means, the emulsions give crumbly materials which cannot be milled on rubber milling equipment and which are composed of cross-linked polymers.

Emulsions of the character employed in accordance with the present invention may be produced from any of the aqueous emulsions of butadiene polymers and co-polymers not containing antioxidant by subjecting such emulsions to oxidation to convert them into the condition referred to above. Thus a two-stage method is employed in which, first, the butadiene polymer or co-polymer emulsion is made by ordinary procedures and are in such a condition that the polymer, if deposited, forms a tacky film and, second, the emulsion so prepared is subjected to an oxidative treatment with hydrogen peroxide or other substances which liberate oxygen under the conditions of treatment such as benzoyl peroxide, ammonium persulfate, acetyl peroxide, tert. butyl hydroperoxide, tert. butyl perbenzoate, etc., to convert the polymer or co-polymer into a condition where, upon deposition on fibers, it gives a non-tacky deposit, and is in the form of a cross-linked polymer.

The above polymer emulsions possess the property of being easily blended with the alkyd resin emulsions to be described and they also possess the property of flexibilizing the more brittle of the alkyd resins and reducing the tackiness of the softer alkyd resins when so mixed and deposited on textile fibers. Polymers and co-polymers which are not fully oxidized in accordance with the above description do not deposit a non-tacky coating under such conditions.

For application on textile fibers mixed with alkyd resin emulsions it is highly desirable to have incorporated in the final emulsion after oxidative vulcanization has taken place, an antioxidant, such as an aliphatic or aromatic amine, polyphenol, sulfide, or derivatives of these types of antioxidant and the like.

When these emulsions are deposited on textile materials, a very great surface of the resins is exposed and subjected to degradative oxidative effects of the air. Consequently antioxidants are highly important in preventing oxidation beyond the desired point, which is best reached while in emulsion form.

Polymers of butadiene alone are of most interest in corresponding with alkyd resin emulsions because of more suitable flexibility imparted to the fiber and also because of economic possibilities. However, as noted above, butadiene copolymers may be advantageously used in certain cases, the copolymers being formed from mixtures of polymerizable compounds wherein butadiene is the major constituent.

The following example of a preferred polymer emulsion for use with alkyd emulsions as explained above will illustrate but is not intended to limit the scope of this invention.

*Example 1*

(A) A butadiene polymer emulsion was made by mixing 50 parts of monomeric butadiene, 100 parts of buffer solution containing disodium and trisodium phosphate at a pH of 11, 5 parts of 30% hydrogen peroxide and 5 parts of sodium lauryl sulfate. The mixture was placed in a pressure reactor and heated for 40 hours at 45° C. Complete polymerization had occurred as evidenced by the fact that internal pressure of the reactor dropped to zero. Using this emulsion to blend with an alkyd resin described later, and then coated on jute fibers, it was noted that desirable flexibility was imparted to the fiber as compared with a coating of the straight alkyd resin, but tackiness was even greater than that caused by the alkyd resin alone.

(B) 320 parts of the above emulsion were treated with 30 parts of 30% hydrogen peroxide solution at 70° C. for 45 minutes (18.75% $H_2O_2$ based on the polymer). After this oxidative prevulcanization had been carried out, 2% of the mono-benzyl ether of hydroquinone based on polymer content of the emulsion was added. This oxidized emulsion was used to blend with alkyd resins as explained hereinafter.

As a preferred alkyd resin emulsion for use as a low-cost coating or impregnation for jute fibers to be used in rug backing, or for other uses wherein flexibility and non-tackiness is desirably gained by use of the aforementioned butadiene polymer emulsions, the following example will illustrate but is not intended to be limiting as a wide range of emulsified alkyd resins may be used for this purpose.

*Example 2*

600 parts of glycerol, 900 parts of phthalic anhydride, and 1800 parts of tall oil (an oily waste material of the paper industry) are cooked in a resin kettle about four hours at 200° C. and 8 to 10 hours at 230–240° C. until the acid number is below 20. About 3000 parts of reaction product is obtained. At this point is added 600 parts of the gasoline-insoluble resinous extract of pinewood. This extract is a low-cost by-product obtained by extracting pinewood and stumps with an aromatic hydrocarbon, removing the solvent and volatile extracts from the solution thus obtained and separating the residue into the gasoline-soluble portion which is rosin and the gasoline-insoluble portion.

This mixture is held at 225–230° C. for ½ hour and further held at 170–180° C. for about ½ hour and the emulsification started. 40 parts of oleic acid are added to the molten resin. The stabilizer solution consists of 3600 parts of a 10% solution of a casein product such as sodium caseinate or other alkali protein and 20 parts of triethanolamine. Finally, 1700 parts of water was added, giving an emulsion containing about 45% solids. This combination makes an excellent stable emulsion by use of simple high-speed mixing although many other emulsifiers, stabilizers, and methods will readily occur to those skilled in the art.

Other useful and low-cost alkyd resins for this purpose include reaction products of 1 mole phthalic anhydride, ¾ to 2 moles glycerol and ½ to 1½ moles tall oil. These may be modified further by use of the above-mentioned gasoline-insoluble aromatic hydrocarbon-soluble resinous pinewood extract up to as high as 100% of the alkyd resin weight.

Other alkyd resins may be made at higher cost by use of other fatty acids in place of the tall oil in Example 2, for instance stearic acid, coconut oil fatty acids, cottonseed oil fatty acids or castor oil fatty acids.

*Example 3*

| | |
|---|---|
| Glycerol | 94 |
| Phthalic anhydride | 160 |
| Cottonseed oil fatty acids | 80 |

React at 240° C. for about 4 hours until acid number is below 25.

*Example 4*

| | |
|---|---|
| Glycerol | 94 |
| Phthalic anhydride | 160 |
| Castor oil | 80 |

React at 235° C. until acid number is below 12.

The above resins emulsify readily by the previously described technique and blend well with the rubbery polymer emulsions which have been discussed.

In order to prepare mixtures of the emulsions of butadiene polymer with alkyd resin it is necessary to adjust solids of each so that gelation will not take place, otherwise simple mixing of the two emulsions is all that is necessary. Mixtures containing 10% to 20% of butadiene polymer solids based on the alkyd resin solids appear to be the most useful and economical range for forming a tack-free coating on jute fibers.

*Example 5*

| | |
|---|---|
| Emulsion of Example 2 resin | 100 (45% solids) |
| Butadiene polymer emulsion of Example 1–B, diluted with an equal weight of water | 50 (15% solids) |

The above emulsions are mixed with slow stirring and the mixture is used to coat or impregnate jute fibers by passing the jute through a bath of the mixed emulsions and wiping the excess emulsion from the fiber by means of a die or other means. The fiber is dried by infra-red lamps or hot-air oven or combination of both. A relatively flexible and non-tacky coated fiber is the result.

A comparison may readily be made to illustrate the value of the completely oxidized butadiene polymer over that of the incompletely oxidized polymer.

*Example 6*

| | |
|---|---|
| Emulsion of Example 2 resin | 100 (45% solids) |
| Butadiene polymer emulsion Example 1–A diluted with an equal weight of water | 50 (15% solids) |

The above emulsions are mixed and coated and dried as in Example 5 and the resulting fiber is considerably more tacky and shows little or no improvement over coating with the alkyd resin emulsion alone.

We claim:

1. A composition capable of depositing a heat-sensitive non-tacky flexible film on textile fibers, which comprises a fusible oil-modified alkyd resin emulsion, and an emulsion obtained by adding a peroxide to an emulsion of a soluble tacky butadiene polymer and heating until the polymer reaches a stage where it is insoluble and non-tacky.

2. A composition capable of depositing a heat-sensitive non-tacky flexible film on textile fibers, which comprises a fusible oil-modified alkyd resin emulsion, and an emulsion of a butadiene polymer oxidatively vulcanized by means of a peroxide in emulsion.

3. A composition capable of depositing a heat-sensitive non-tacky flexible film on textile fibers, which comprises an emulsion of a fusible oil-modified alkyd resin, an emulsion of a butadiene polymer oxidatively vulcanized by means of a peroxide in emulsion, and an antioxidant for the pre-vulcanized polymer.

4. A composition capable of depositing a heat-sensitive non-tacky flexible film on textile fibers, which comprises an emulsion of a fusible oil-modified alkyd resin, an emulsion obtained by heating an emulsion of a soluble butadiene polymer with a peroxide until the polymer is converted to an insoluble non-tacky form, and an antioxidant for the polymer.

5. A composition capable of depositing a heat-sensitive non-tacky flexible film on textile fibers, which comprises a fusible oil-modified alkyd resin emulsion containing a protein stabilizing agent, an emulsion obtained by heating an emulsion of a soluble butadiene polymer with hydrogen peroxide until the polymer is converted to an insoluble non-tacky form, and an antioxidant for the polymer.

6. A composition capable of depositing a heat-sensitive non-tacky flexible film on textile fibers, which comprises a fusible oil-modified alkyd resin emulsion containing a protein stabilizing agent, an emulsion obtained by heating an emulsion of a soluble butadiene polymer with hydrogen peroxide until the polymer is converted to an insoluble non-tacky form, and an antioxidant for the polymer, the composition containing from about 10% to 20% of butadiene polymer based on the solids of the alkyd resin emulsion and about 2% antioxidant based on the butadiene polymer.

7. A composition comprising a protein-stabilized fusible oil-modified alkyd resin emulsion, an emulsion containing polymeric butadiene oxidatively vulcanized after polymerization to the non-tacky stage resulting when an emulsion of a soluble butadiene polymer is heated for 45 minutes at 70° C. with 18.75% of hydrogen peroxide based on the polymer, and an antioxidant for the polymer.

8. A composition comprising a protein-stabilized fusible oil-modified alkyd resin emulsion, an emulsion containing polymeric butadiene oxidatively vulcanized to the non-tacky stage resulting when 320 parts of an emulsion containing about 30% soluble butadiene polymer is heated for 45 minutes at 70° C. with 30 parts of 30% hydrogen peroxide, and an antioxidant for the polymer.

9. A composition comprising (a) 2 parts of an emulsion composed of the following ingredients in substantially the proportions by weight of:

| | Parts |
|---|---|
| Tall oil-phthalic anhydride-glycerol reaction product | 3,000 |
| Gasoline-insoluble aromatic hydrocarbon-soluble resinous pinewood extract | 600 |
| Sodium caseinate (10% solution) | 3,600 |
| Oleic acid | 40 |
| Triethanolamine | 20 |
| Water | 1,700 |

(b) 1 part of an emulsion consisting of equal parts of water and the emulsion obtained by heating at about 70° C. for 45 minutes the following:

| | Parts |
|---|---|
| Emulsion of a soluble butadiene polymer containing about 30% solids | 330 |
| Hydrogen peroxide (30%) | 30 | and (c) 2% of monobenzyl ether of hydroquinone based on the polymer.

JOHN W. ROBERTSON.
JOHN B. RUST.

REFERENCES CITED

The following references are of record in the file of this patent:

UNITED STATES PATENTS

| Number | Name | Date |
|---|---|---|
| 2,400,054 | Robinson et al. | May 7, 1946 |

OTHER REFERENCES

Talalay et al., "Synthetic Rubber from Alcohol," pp. 239 and 240, Interscience, 1945. (Copy in Div. 50.)